United States Patent
Nabetani et al.

(10) Patent No.: US 8,995,346 B2
(45) Date of Patent: Mar. 31, 2015

(54) WIRELESS COMMUNICATION APPARATUS AND WIRELESS COMMUNICATION METHOD

(71) Applicants: Toshihisa Nabetani, Kawasaki (JP); Ryoko Matsuo, Tokyo (JP); Tomoko Adachi, Kawasaki (JP); Tomoya Tandai, Tokyo (JP)

(72) Inventors: Toshihisa Nabetani, Kawasaki (JP); Ryoko Matsuo, Tokyo (JP); Tomoko Adachi, Kawasaki (JP); Tomoya Tandai, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 129 days.

(21) Appl. No.: 13/717,361

(22) Filed: Dec. 17, 2012

(65) Prior Publication Data

US 2013/0155955 A1  Jun. 20, 2013

(30) Foreign Application Priority Data

Dec. 20, 2011 (JP) ................................. 2011-278570

(51) Int. Cl.
*H04W 74/08* (2009.01)

(52) U.S. Cl.
CPC ................................. *H04W 74/0816* (2013.01)
USPC ............ 370/328; 370/329; 370/338; 370/252

(58) Field of Classification Search
CPC . H04W 74/0816; H04W 84/12; H04W 48/16; H04W 74/08; H04W 74/0808
USPC .................................. 370/328, 329, 338, 252
See application file for complete search history.

(56) References Cited

U.S. PATENT DOCUMENTS

| | | | |
|---|---|---|---|
| 2002/0193072 A1* | 12/2002 | Alinikula et al. | 455/41 |
| 2004/0004973 A1 | 1/2004 | Lee | |
| 2008/0279210 A1* | 11/2008 | Naka et al. | 370/448 |
| 2008/0293366 A1* | 11/2008 | Haartsen | 455/69 |

FOREIGN PATENT DOCUMENTS

| | | |
|---|---|---|
| EM | 1 802 041 A1 | 6/2007 |
| JP | 2006135441 A | 5/2006 |
| JP | 2011-035600 | 2/2011 |

OTHER PUBLICATIONS

Extended European Search Report (EESR) dated Apr. 24, 2013 (in English) issued in counterpart European Application No. 12197825.8.
Hu Zhengbing et al.: "A QoS Provisioning MAC Protocol for IEEE 802.11 WLANs": May 14, 2007: Embedded Software and Systems: pp. 18-27 (in English).
IEEE Standard for Wireless LANs, IEEE Std. 802 11e-2005: Chapter 9.9.1: pp. 80-85 (in English).

(Continued)

*Primary Examiner* — Jamal Javaid
(74) *Attorney, Agent, or Firm* — Holtz, Holtz, Goodman & Chick PC

(57) ABSTRACT

A wireless communication apparatus performs access control which starts transmission after a backoff time passes since an available state of a channel is detected through carrier sense, the backoff time being set based on a random value selected within a contention window width. The wireless communication apparatus includes a remaining time calculating unit which calculates a remaining time until a request delay time time-outs after data is generated, and a setting unit which sets the contention window width according to the remaining time calculated by the remaining time calculating unit.

14 Claims, 7 Drawing Sheets

(56) References Cited

OTHER PUBLICATIONS

Applicant-provided Background Art Information Sheet.

Japanese Office Action dated Sep. 12, 2014, issued in counterpart Japanese Application No. 2011-278570.

\* cited by examiner

WIRELESS COMMUNICATION APPARATUS AND WIRELESS COMMUNICATION METHOD

CROSS REFERENCE TO RELATED APPLICATIONS

This application is based upon and claims the benefit of priority from the prior Japanese Patent Application No. 2011-278570, filed on Dec. 20, 2011, the entire contents of which are incorporated herein by reference.

FIELD

Embodiments described herein relate to a wireless communication apparatus and a wireless communication method, and more particularly, to a wireless communication apparatus that uses, for example, a carrier sense multiple access with collision avoidance (CSMA/CA) scheme.

BACKGROUND

As an access scheme used in a wireless communication system such as a wireless LAN (IEEE 802.11) or Zigbee, there is a carrier sense multiple access with collision avoidance (CSMA/CA). According to this scheme, each terminal performs carrier sense of a channel before start of transmission, and transmits a packet after detecting that a channel is in an available (idle) state for a constant period. Here, the waiting constant period is a time obtained by adding a backoff time, which is based on a random value selected at random from a contention window (CW) range, to a given fixed time. In general, when the terminals each select the backoff time at random, collision can be avoided although the plurality of terminals simultaneously transmit packets. However, when the plurality of terminals incidentally select the same random value, a collision occurs. Therefore, in this case, each terminal reduces a collision probability by expanding the CW range, and then retransmits the packet. The CW starts from the minimum value CWmin and expands to twice every retransmission until reaching the maximum value CWmax.

Thus, in the CSMA/CA scheme, the CW increases with an increase in the number of retransmissions due to the collision or the like. Therefore, since the backoff time increases every retransmission, there is a concern that time delay caused due to the retransmission may be prolonged. For this reason, in an environment in which there are a considerable number of terminals and a collision occurrence frequency thus increases, it can be considered that a delay time up to transmission completion increases, and thus a request delay time may not be satisfied. As a method of resolving this problem, for example, a method has been suggested in which the problem of the unnecessary increase in the delay time caused due to overhead involving the backoff time is prevented by controlling the CW range according to the number of terminals or a traffic amount. Further, in the wireless LAN system, an EDCA scheme has been suggested in the IEEE 802.11e standard. In the EDCA scheme, the kinds of data are classified into four categories and the categories are each prioritized. For example, with regard to voice communication which is a category with short request delay and high priority, a fixed time (AIFS: Arbitration Inter Frame Space), CWmin, and CWmax are set to be short. Thereby, data belonging to a category with high priority is configured to be preferentially transmitted. According to the EDCA scheme, it is possible to prevent the time-out of data required to be less delayed by the priority control.

In the above-mentioned method, however, the control is merely performed so as to be suitable for a traffic amount relatively in consideration of the delay time, and the delay time between terminals in the environment of the same traffic amount is not guaranteed. Even in the EDCA scheme, a relative transmission priority order is merely controlled between data with different priorities. The delay time between the data with the same priority is not guaranteed.

Thus, in the conventional method, relative control is performed according to a traffic amount or the kinds of data. The problem remains in that the CW increases with an increase in the number of retransmission caused due to a collision or the like, and thus the backoff time increases every retransmission. Accordingly, the fundamental problem still remains in that the time delay caused due to the retransmission is prolonged. That is, since an operation is merely performed according to the normal CSMA/CA scheme in the same traffic amount or the same kind of data, delay guaranteeing control to prevent the time-out of the request delay of data has not been performed.

DETAILED DESCRIPTION

According to some embodiments, there is provided a wireless communication apparatus performing access control which starts transmission after a backoff time passes since an available state of a channel is detected through carrier sense, the backoff time being set based on a random value selected within a contention window width, including: a remaining time calculating unit and a setting unit.

The remaining time calculating unit calculates a remaining time until a request delay time time-outs after data is generated.

The setting unit sets the contention window width according to the remaining time calculated by the remaining time calculating unit.

Hereinafter, embodiments will be described in detail with reference to the drawings. Each embodiment relates to a wireless communication using a CSMA/CA scheme between a plurality of wireless communication apparatuses. In practice, the wireless communication apparatuses include a wireless terminal and a wireless base station, which have basically the same configuration in view of the embodiment.

First Embodiment

Figure 1:
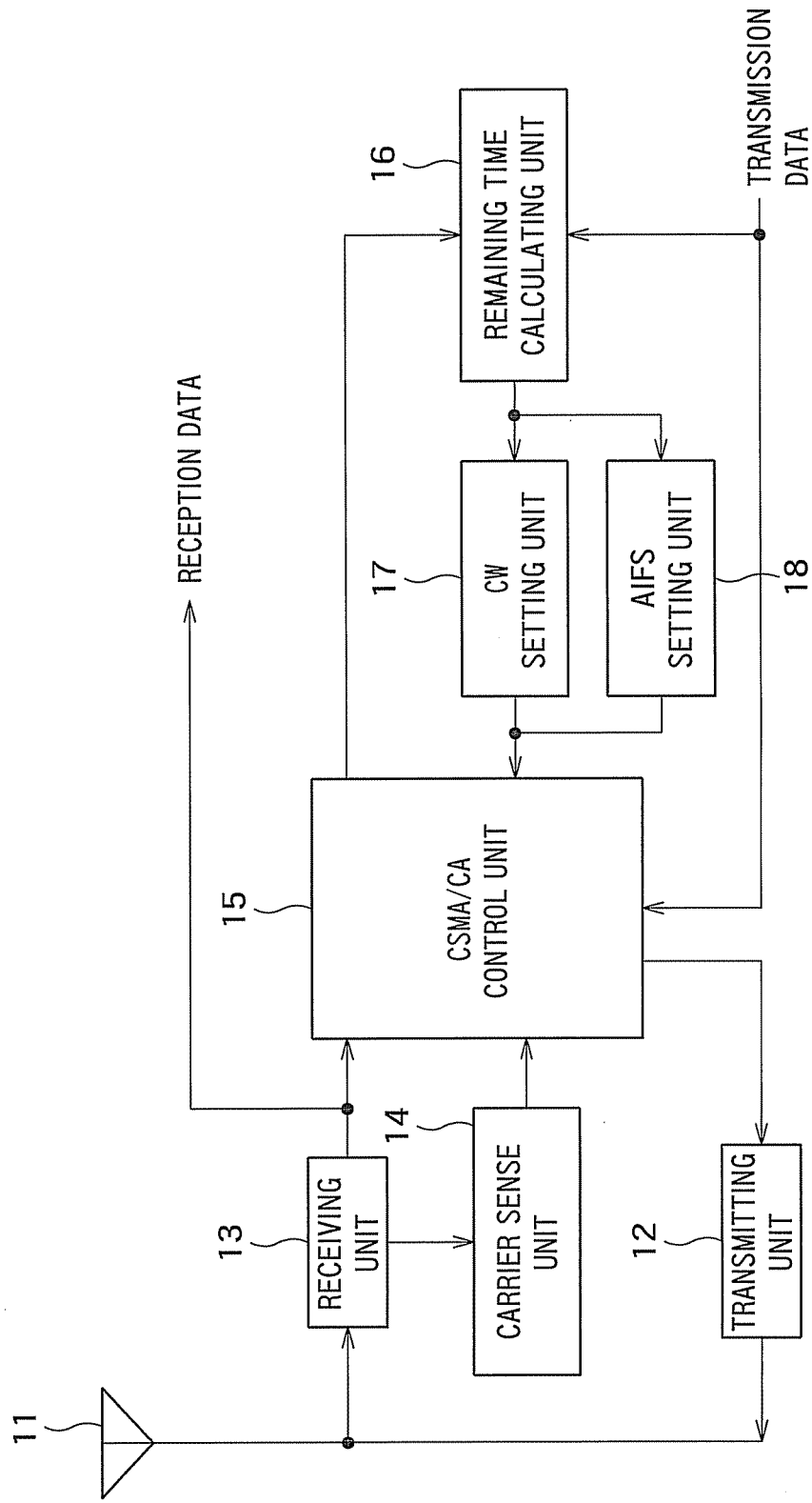
FIG. 1 is a block diagram illustrating an example of the configuration of a wireless communication apparatus according to an embodiment.

FIG. 1 is a block diagram illustrating an example of the configuration of a wireless communication apparatus according to an embodiment. As illustrated in FIG. 1, the wireless communication apparatus according to the embodiment at least includes an antenna unit 11, a transmitting unit 12, a receiving unit 13, a carrier sense unit 14, a carrier sense multiple access with collision avoidance (CSMA/CA) control unit 15, a remaining time calculating unit 16, a contention window (CW) setting unit 17, and an arbitration inter frame space (AIFS) setting unit 18.

When the wireless communication apparatus performs transmission, an instruction to transmit new transmission data is given from an upper layer and the transmission data is handed to the CSMA/CA control unit 15. The CSMA/CA control unit 15 generates a desired data frame and performs predetermined CSMA/CA control based on carrier sense information obtained from the carrier sense unit 14 performing carrier sense. The CSMA/CA control unit 15 outputs the data frame to the transmitting unit 12 at an acquisition timing of a transmission access right. The transmitting unit 12 performs a process necessary for desired transmission on the data frame, such as D/A conversion, a modulation process, or a frequency conversion process of converting the frequency of a wireless signal into a predetermined frequency, and then transmits the wireless signal to a wireless terminal or a wireless base station via the antenna unit 11.

Further, when an instruction to transmit new transmission data is given from the upper layer, the remaining time calculating unit 16 concurrently calculates a time remaining until the time-out of a request delay time of the transmission data. Here, the request delay time is defined in advance according to a kind of transmission data. The request delay for each transmission data is notified of together with data from the upper layer or can be comprehended, for example, referring to a database. Any request delay time may be used, when the remaining time calculating unit 16 can at least calculate a time remaining until the time-out of the request delay time. Basically, the remaining time calculated by the remaining time calculating unit 16 is the same as the request delay time, when an instruction to transmit new transmission data is given.

Based on the remaining time calculated by the remaining time calculating unit 16, a CW value and an AIFS value used for the CSMA/CA control of the CSMA/CA control unit 15 are determined by the CW setting unit 17 and the AIFS setting unit 18, respectively. That is, the wireless communication apparatus according to this embodiment performs the CSMA/CA control based on the CW value and the AIFS value determined according to the time remaining until the time-out of the request delay time. An operation of the CSMA/CA control performed by the CSMA/CA control unit 15, and a CW setting policy in the CW setting unit 17 and an AIFS setting policy in the AIFS setting unit 18 respectively set based on the remaining time calculating unit 16 will be described in detail below.

On the other hand, when the wireless communication apparatus performs reception, the receiving unit 13 receives a wireless signal via the antenna unit 11 and performs a process necessary for reception, such as frequency conversion to a baseband, A/D conversion, or a demodulation process. The receiving unit 13 hands the reception data destined for the wireless communication apparatus to an upper layer and also notifies the CSMA/CA control unit 15. The CSMA/CA control unit 15 determines whether a retransmission process is necessary depending on reception or non-reception of an ACK frame for the transmission data. The CSMA/CA control unit 15 performs a process to acquire a transmission access right to perform retransmission again under predetermined CSMA/CA control, when the CSMA/CA control unit 15 determines that the retransmission process is necessary without obtaining an ACK reply to the transmission data. The CSMA/CA control unit 15 causes the transmitting unit 12 to retransmit the data at an acquisition timing of the retransmission access right.

Here, compared to a case in which new data is transmitted, a time have passed at the time of the retransmission by, for example, a time required to transmit the new data or a time required to wait an ACK reply to determine the retransmission of the new data. That is, a remaining time for the request delay of the data decreases at the time of the retransmission. Further, the remaining time further decreases with an increase in the number of retransmissions. Accordingly, whenever the CSMA/CA control is performed at the time of the retransmission, the remaining time calculating unit 16 updates the time remaining until the time-out of the request delay of the data again. Based on the updated remaining time, the CW setting unit 17 and the AIFS setting unit 18 determine the CW value and the AIFS value again according to policies to be described below, respectively, and the CSMA/CA control unit 15 performs a process to acquire the transmission access right to perform the retransmission based on the redetermined CW value and AIFS value.

When another wireless communication apparatus acquires the transmission access right earlier before the wireless communication apparatus by itself acquires the transmission access right, that is, when the carrier sense is Busy, the CSMA/CA control is performed again from a timing at which the carrier sense becomes Idle. This case is not limited to the transmission of retransmission data, but may occur even in a case of new data. However, the time remaining until the time-out of the request delay of the data decreases by a time during which the transmission of another wireless communication apparatus transmits. Therefore, whenever the carrier sense becomes Busy and the CSMA/CA control is necessary again, the remaining time calculating unit 16 updates the time remaining until the time-out of the request delay of the data again and the CSMA/CA control unit 15 resumes the CSMA/CA control to acquire the transmission access right using the CW value and the AIFS value set based on the remaining time updated by the CSMA/CA control unit 15.

Accordingly, in the wireless communication apparatus according to this embodiment, the CSMA/CA control is performed using the CW value and the AIFS value determined based on the time remaining until the time-out at each timing at which the CSMA/CA control is performed at each time of the new transmission and the retransmission, irrespective of the new transmission and the retransmission.

Policies of the CW value and the AIFS value respectively set by the CW setting unit 17 and the AIFS setting unit 18 will be described.

Figure 2:
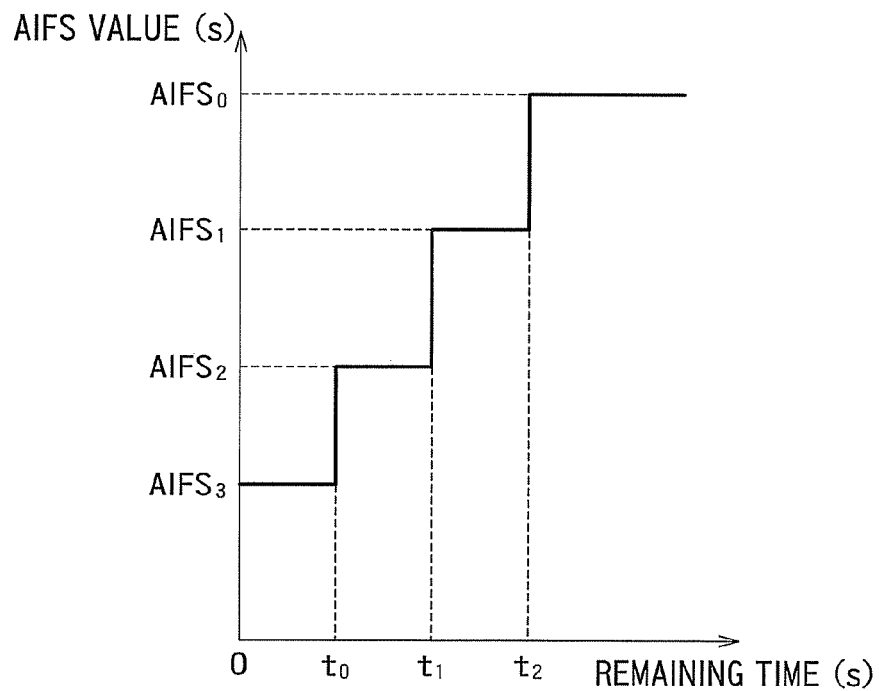
FIG. 2 is a diagram illustrating an example (part 1) of a method of determining an AIFS value set by an AIFS setting unit according to the embodiment.
Figure 3:
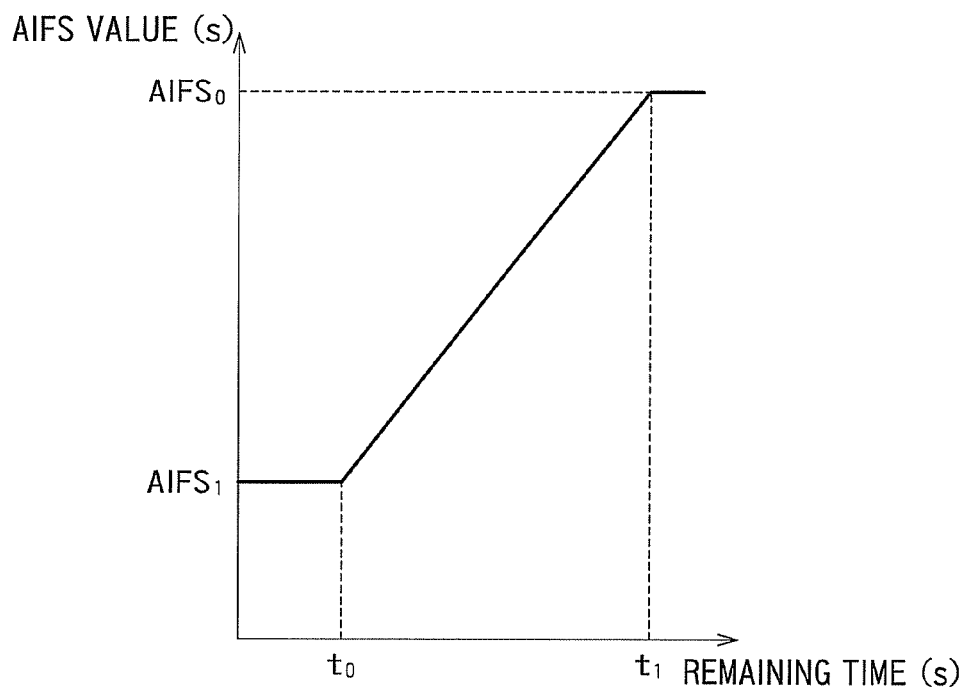
FIG. 3 is a diagram illustrating an example (part 2) of a method of determining an AIFS value set by the AIFS setting unit according to the embodiment.
Figure 4:
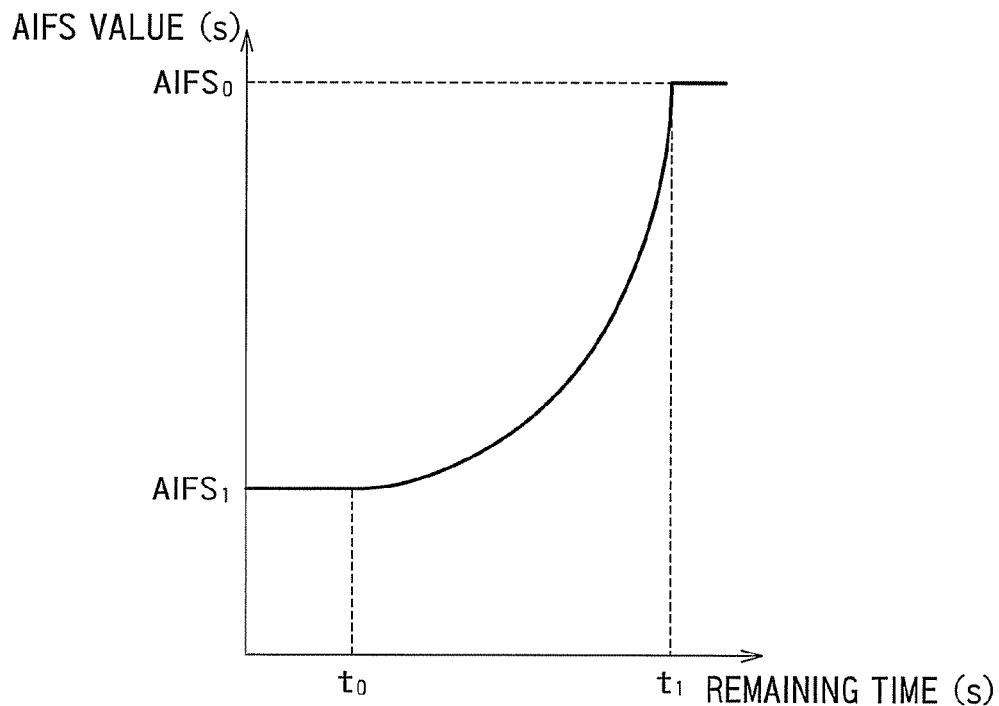
FIG. 4 is a diagram illustrating an example (part 3) of a method of determining an AIFS value set by the AIFS setting unit according to the embodiment.

First, the AIFS value set by the AIFS setting unit 18 is determined basically according to the remaining time calculated by the remaining time calculating unit 16 according to a policy in which the smaller the remaining time is, the smaller the AIFS value is set. Specifically, as illustrated in an example of FIG. 2, the AIFS value is determined by a method of selecting one of AIFS values defined in advance in stages according to the remaining time. Alternatively, as illustrated in examples of FIGS. 3 and 4, the AIFS value is determined by a method of defining only the maximum AIFS value ($AIFS_0$) and the minimum AIFS value ($AIFS_1$) in advance and selecting or calculating the AIFS value by interpolating the $AIFS_0$ and the $AIFS_1$ according to the remaining time calculated by the remaining time calculating unit 16. Of course, the AIFS value may be determined by a method of combining these methods. Any method may be used, as long as the AIFS value set by the AIFS setting unit 18 is at least set to be smaller as the time remaining until the time-out of the request delay is smaller.

Next, the CW value set by the CW setting unit 17 is determined basically, as in the AIFS value, according to a policy in which the smaller the remaining time calculated by the remaining time calculating unit 16 is, the smaller the CW value is set. The CW value is determined by the same method as the method of determining the AIFS value illustrated in FIGS. 2 to 4.

Figure 5:
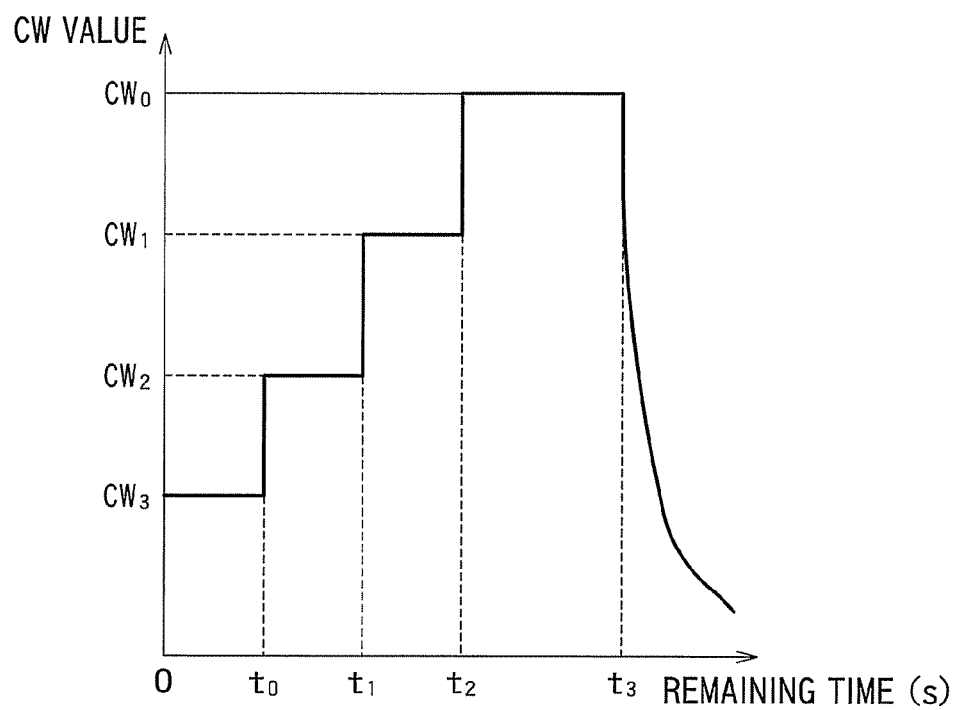
FIG. 5 is a diagram illustrating an example of a method of determining a CW value set by a CW setting unit according to the embodiment.

Here, as the method of setting the CW value, as illustrated in FIG. 5, a method of increasing the CW value twice every retransmission may be performed, as in the conventional CSMA/CA, when the remaining time is large and the transmission time remains sufficiently until the time-out ($t_3$ or more in an example of FIG. 5). That is, a method may be used in which the CW value is gradually increased according to the retransmission during a period (equal to or greater than $t_3$ in the example of FIG. 5) in which the remaining time is sufficient, as in the conventional example, and the CW value is gradually decreased according to the remaining time from a stage at which a given time ($t_3$ in the example of FIG. 5) does not pass, irrespective of the number of retransmissions. Further, the values (for example, $t_0$ of FIG. 2 and $t_0$ of FIG. 5) of a time used in the AIFS setting unit 18 and the CW setting unit 17 may be the same or may be independent values.

Figure 6:
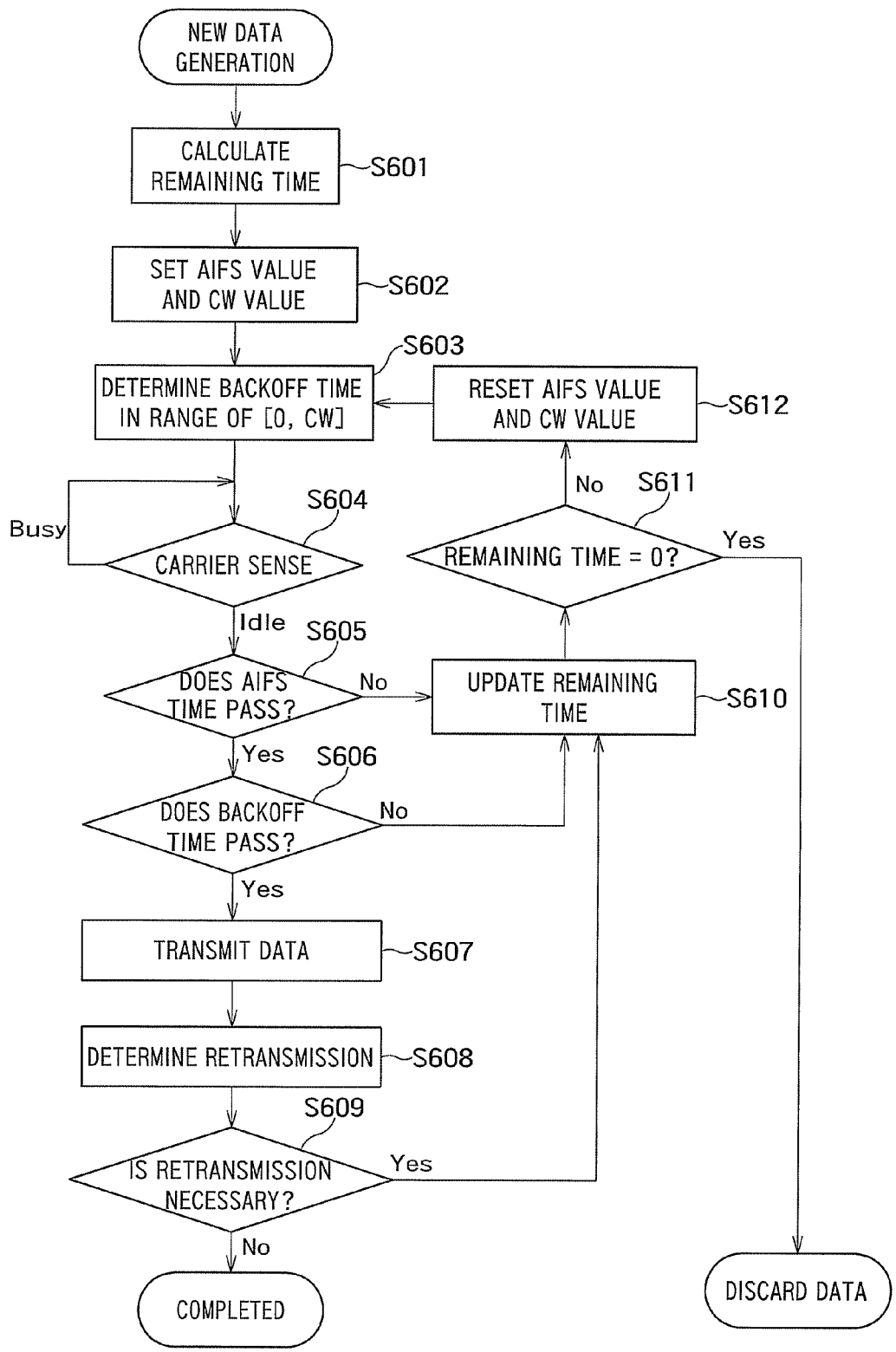
FIG. 6 is a diagram illustrating an example of a CSMA/CA control flow according to the embodiment.

Next, a processing flow of the CSMA/CA control will be described with reference to the flowchart illustrated in FIG. 6. First, when an instruction to transmit new transmission data is given from the upper layer, the time remaining until the time-out of the request delay time of the transmission data is calculated (S601). Basically, the remaining time calculated at this timing is the same value as the request delay time. Next, according to the above-described policies, the AIFS value and the CW value are set according to the remaining time (S602). Based on the set CW value, the CSMA/CA control unit 15 determines a backoff time according to the value selected at random within the range from 0 to the CW value (S603). Thereafter, the CSMA/CA control is performed based on the set AIFS value and the backoff time.

When the carrier sense result (S604) from the carrier sense unit 14 is Idle, the CSMA/CA control unit 15 determines whether a channel continues to be Idle during the set AIFS time (S605).

When it is determined in S605 that the channel continues to be Idle, it is also determined whether the channel continues to be Idle during the determined backoff time (S606). When it is determined in S606 that the channel continues to be Idle during the backoff time, it is determined that the wireless communication terminal itself can acquire the transmission access right, and thus data is transmitted (S607). After the data is transmitted, it is determined whether retransmission is necessary depending on presence or absence of an ACK reply (S608). It is determined that the retransmission of the reception data is not necessary based on the ACK reply or the like (No in S609), the transmitting process is completed.

When it is determined in S605 that after the Idle state of the carrier sense continues, the channel becomes Busy before arrival of the AIFS time, the remaining time is updated by calculating the remaining time of the data again at this timing (S610). Then, it is determined whether the updated remaining time is equal to or less than a threshold value (S611). Here, it is determined whether the updated remaining time is 0 s, that is, the updated remaining time reaches the time-out (S611). When the updated remaining time reaches the time-out (Yes), the data is not transmitted and is discarded. Conversely, when the updated remaining time does not reach the time-out (No), the AIFS value and the CW value are set according to the re-updated remaining time according to the above-described polices (S612). Here, since the updated remaining time is a time at least less than the remaining time calculated in S601, each of the AIFS value and the CW value reset in S612 is basically less than the values initially set in S602. A backoff time is determined according to the value selected at random in the range from 0 to the CW value based on the CW value reset in S612 (S603), and the CSMA/CA control unit 15 performs the CSMA/CA control based on the AIFS value and the backoff time reset again.

When it is determined in step S606 that after the Idle state of the carrier sense continues and the AIFS elapses, the channel becomes Busy before arrival of the backoff time, the remaining time of the data is calculated again at this timing in the same way and the remaining time is updated (S610). The subsequent process is the same.

The case in which the determination of S606 proceeds to S610 is different from the case in which the determination of S605 proceeds to S610. That is, the determined backoff time is counted down only for a given time. Therefore, the following process may be performed, which is not illustrated in FIG. 6. That is, after the CW value is reset via S606 (S612), a backoff time corresponding to the value determined at random again within the range of the reset CW value is compared to the remaining backoff time at the time of the proceeding to S610. When the remaining backoff time is smaller, the remaining backoff time at the time of the proceeding to S610 continues to be used without change in the subsequent CSMA/CA control.

When it is determined in S609 that the retransmission is necessary (Yes), the process proceeds to S610 and the remaining time is updated similarly. Thereafter, the AIFS value and the CW value are similarly reset according to the updated remaining time. In this case, however, as described above, only in the resetting of the CW value, a case can be considered in which the CW value is increased while the remaining time is sufficient, as in the conventional example.

Figure 7:
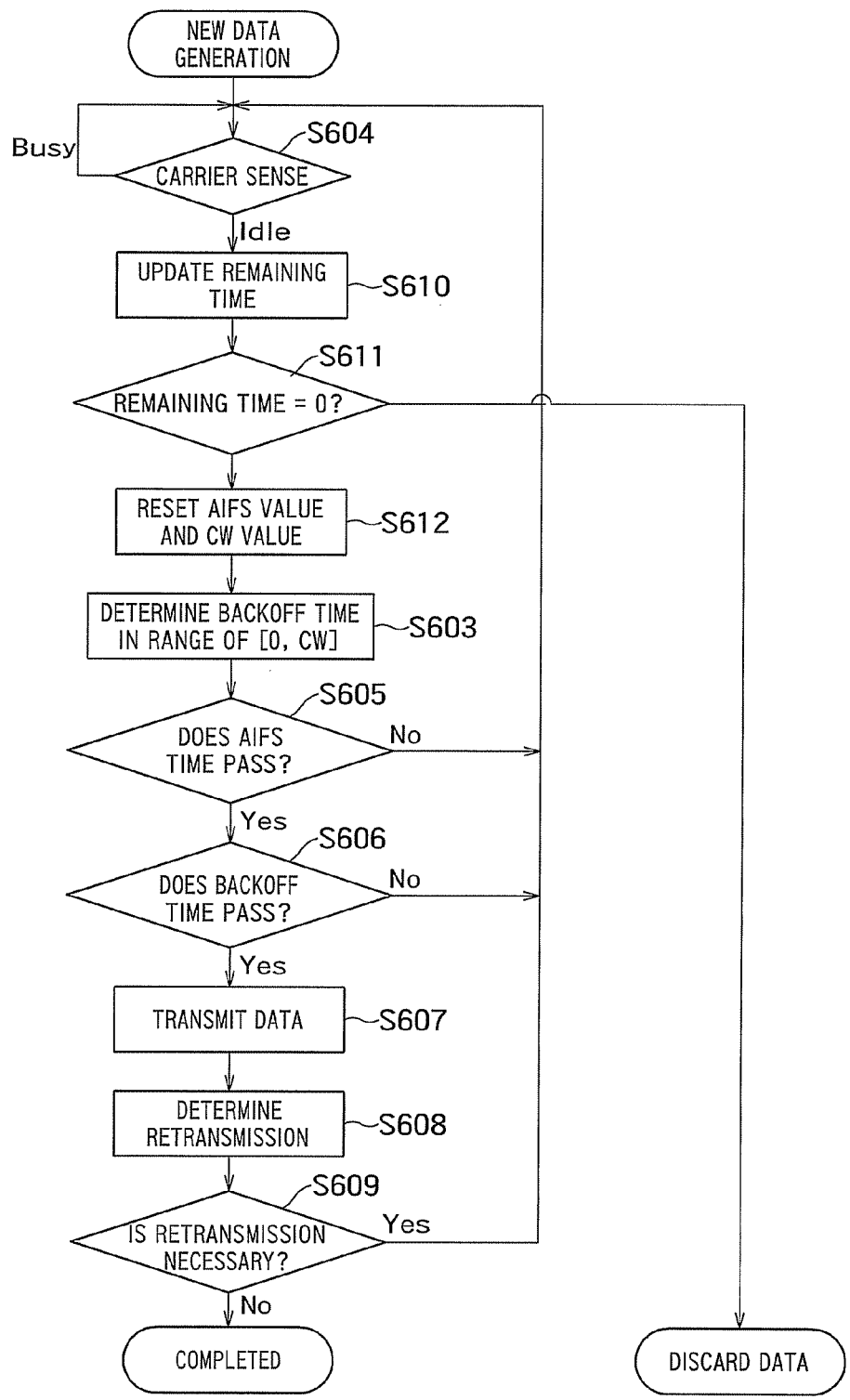
FIG. 7 is a diagram illustrating another example of the CSMA/CA control flow according to the embodiment.

FIG. 7 is a flowchart illustrating another example of the processing flow of the CSMA/CA control. In the flow, the order of some of the processing flow and the steps of FIG. 6 is changed. Specifically, the process (S610) of updating the remaining time, the process (S611) of determining whether the remaining time reaches the time-out, the process (S612) of resetting the AIFS value and the CW value based on the remaining time, and the process (S603) of determining the backoff time are performed at the timing at which the carrier sense result of S604 becomes Idle. Thus, even when a time was required for the carrier sense of S604, the AIFS value and the CW value can be set by appropriately reflecting the remaining time at that time.

Figure 8:
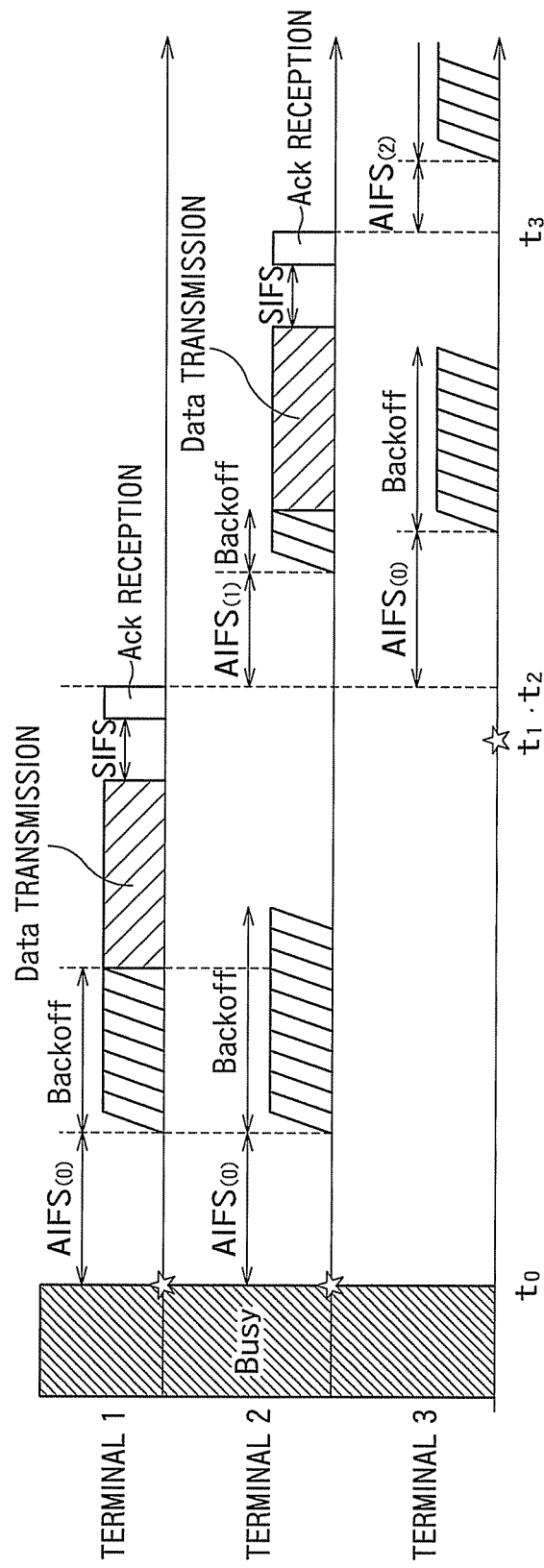
FIG. 8 is a diagram illustrating an example of a specific operation according to the embodiment.

FIG. 8 is a diagram illustrating an example of a specific operation according to this embodiment. In FIG. 8, for example, when there are three wireless communication apparatuses and each data is generated at time $t_0$ (Terminals 1 and 2) and time (Terminal 3), the remaining time is updated at a timing at which the carrier sense result becomes Idle again (the case of the flow illustrated in FIG. 7).

In Terminals 1 and 2, an AIFS value ($AIFS_0$) and a CW ($CW_0$) value are set and each random backoff time is determined based on $CW_0$, at time $t_0$ when the data is generated. In FIG. 8, for example, the backoff time in Terminal 1 is determined to have a value shorter than the backoff time in Terminal 2 as the result of the random number generation in both the terminals. Therefore, in Terminal 1, the backoff time is completed earlier and the data is transmitted. On the other hand, when Terminal 1 starts transmitting the data, the carrier sense result becomes Busy, and thus Terminal 2 waits until the carrier sensor becomes Idle again. During the meantime, Terminal 3 generates the data at time $t_1$. The AIFS value ($AIFS_0$) and the CW ($CW_0$) value are also set in Terminal 3. Since the channel becomes Idle at time $t_2$, the CSMA/CA control is resumed again in Terminals 2 and 3.

Here, in Terminal 2, since a time passes by ($t_2-t_0$), the remaining time is also decreased by ($t_2-t_0$). Therefore, in Terminal 2, the AIFS value and the CW value are reset to $AIFS_1$ and $CW_1$ smaller than the $AIFS_0$ and the $CW_0$, respectively, according to the decreased remaining time. That is, at a timing at which the channel becomes Idle at time $t_2$, the CSMA/CA is performed in Terminal 2 using the $AIFS_1$ and the backoff time determined at random within the range in which the $CW_1$ are the maximum. Terminal 3 performs the CSMA/CA using the $AIFS_0$ and the backoff time determined at random within the range in which the $CW_0$ are the maximum. Since $AIFS_1 < AIFS_0$, the AIFS time passes earlier in Terminal 2, and thus a backoff period begins. Further, with regard to the backoff time, since $CW_1 < CW_0$, there is a high probability that the backoff time is set to be smaller stochastically in Terminal 2. Further, Terminal 2 can preferentially acquire the transmission access right than Terminal 3. In Terminal 3, the remaining time is updated again at time $t_3$, the $AIFS_2$ and the $CW_2$ are reset according to the remaining time decreased by ($t_3-t_1$), and the CSMA/CA control is resumed.

Thus, when Terminal 2 is compared to Terminal 3, there is a high probability that Terminal 2 in which the smaller remaining time is set can preferentially transmit the data than Terminal 3. As a result, since an increase in the delay time can be suppressed, the probability that the remaining time reaches the time-out can be decreased, compared to the conventional example.

Next, a relation between specific values of the AIFS value and the CW value set according to the remaining time will be described with reference to FIG. 9. In the following description, to facilitate the description, it is assumed that $AIFS_{n-1}$ and $CW_{n-1}$ are an AIFS value and a CW value, respectively, at a given remaining time $T_{n-1}$, and $AIFS_n$ and $CW_n$ are an AIFS value and a CW value at a remaining time $T_n$ less than $T_{n-1}$. Further, a relation of "$AIFS_n < AIFS_{n-1}$" and a relation of "$CW_n < CW_{n-1}$" are satisfied.

Figure 9:
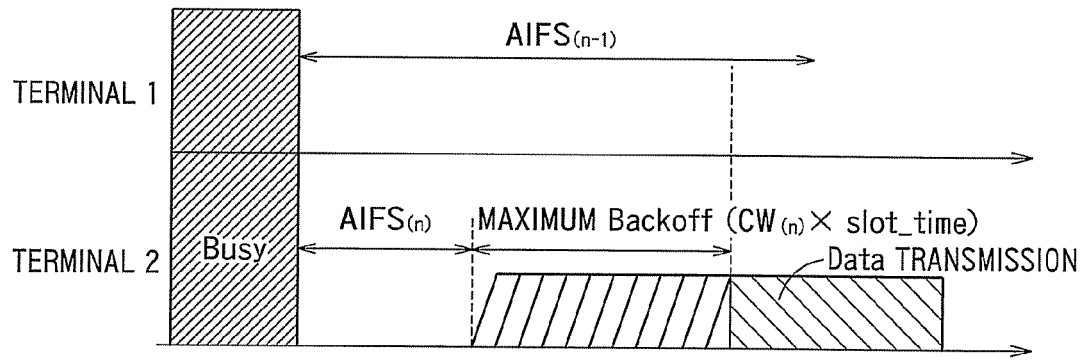
FIG. 9 is a diagram (part 1) concretely illustrating a relation between a AIFS value and a CW value according to the embodiment.

As illustrated in FIG. 9, the AIFS value and the CW value are set so that a relation of "$AIFS_n + CW_n \times slot\_time < AIFS_{n-1}$" is satisfied. Since an actual backoff time is a time obtained by multiplying a value selected at random within a range, in which the CW value is the maximum, by slot_time (9 μs in a case of the IEEE 802.11 wireless LAN), $CW_n \times slot\_time$ means the maximum backoff time capable of being acquired at that time. Therefore, by setting a specific AIFS value and a specific CW value so that the above-mentioned relation expression is satisfied, Terminal 2 can preferentially acquire the transmission access right in preference to Terminal 1 in which the remaining time is set to be larger (remaining time=$T_{n-1}$), irrespective of the result of the random number generation of Terminal 2 (remaining time=$T_n$). Accordingly, the preferential transmission of the data with the smaller remaining time can be reliably guaranteed.

Figure 10:
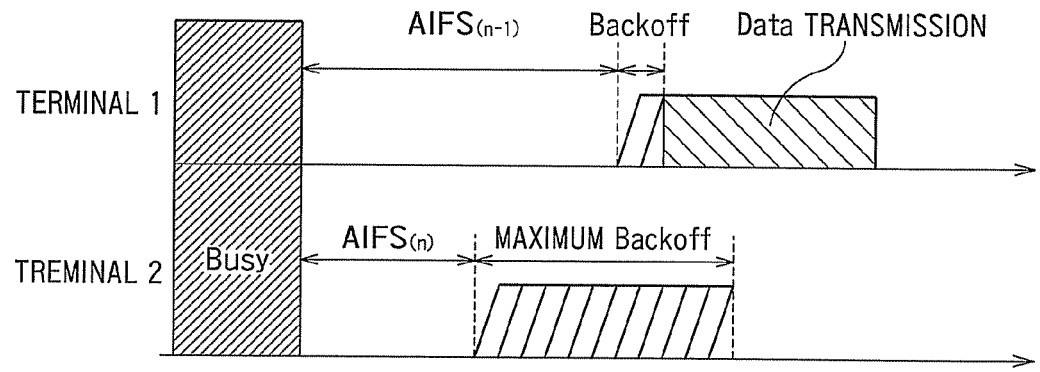
FIG. 10 is a diagram (part 2) concretely illustrating a relation between a AIFS value and a CW value according to the embodiment.

When the above-mentioned relation expression is not necessarily guaranteed, as illustrated in FIG. 10, for example, a case can be considered in which Terminal 1 selects a smaller value within a range in which the $CW_{n-1}$ is the maximum as the result of the random number generation and, on the other hand, Terminal 2 selects a larger value ($CW_n$ which is the maximum in FIG. 10) within a range in which $CW_n$ is the maximum as the result of the random number generation. In this case, Terminal 1 in which the larger remaining time is set acquires the transmission access right earlier.

Thus, stochastically, Terminal 2 in which a smaller remaining time is set can preferentially acquire the transmission access right. However, depending on the result of the random number generation, it is not necessarily guaranteed that Terminal 2 in which a smaller remaining time is set acquires the transmission access right earlier. When Terminal 1 acquires the transmission access right earlier, Terminal 2 in which a smaller remaining time is set has to wait until the carrier sense becomes Idle again. Therefore, the delay time may increase. Accordingly, by utilizing values satisfying the above-mentioned relation expression as the specific values of the AIFS value and the CW value, the preferential transmission of data for which the remaining time is smaller can be reliably guaranteed. Thus, it is possible to prevent the delay time from unnecessarily increasing. Here, it is not necessary to utilize an AIFS value and a CW value for which the above-mentioned relation expression is always maintained even at any remaining time. For example, an AIFS value and a CW value for which the above-mentioned relation expression is maintained can be utilized, only when the remaining time is close to the time-out, for example, the remaining time is less than a threshold value.

The CW value is set according to the remaining time, and then the backoff time is determined at random based on the CW value. Normally, a generated random number conforms to a uniform distribution in which a probability density distribution is constant in a range from 0 to CW. This embodiment suggests a method of using a random number conforming to another distribution rather than a random number conforming to a uniform distribution as the probability density distribution and changing an expectation value of the probability density distribution according to the calculated remaining time. Specifically, the smaller a remaining time is, the smaller an expectation value $E(x)$ of the probability density distribution is set to be. That is, this means that a probability at which a smaller probability variable is selected even at the same CW value is high, as the remaining time is smaller. As an example of a probability density function $f(x)$, there is an exponential distribution conforming to:

$$f(x) = \begin{cases} \lambda e^{-\lambda x} & (x \geq 0) \\ 0 & (x < 0) \end{cases}$$

As another example, there is a Pareto distribution. Since an expectation value is expressed to $E(x)=1/\lambda$ in the case of the exponential distribution, the expectation value can be changed by changing $\lambda$ according to the remaining time.

In the range from 0 to CW, in which the CW is the upper limit value, as the random number generation range, as in the above-mentioned case, a random value is selected with the probability density function conforming to the exponential distribution or the like. The CW which is the upper limit may be smaller, as the remaining time is smaller, as described above. At this time, in the conventional CSMA/CA, the CW may be increased twice every retransmission until the remaining time reaches a predetermined value. When the CW is increased twice every retransmission, the range in which the random number is selected is broadened. However, by increasing the probability in which a smaller value is selected according to the remaining time (that is, decreasing the expectation value), it is possible to obtain the advantage of preferentially transmitting data, compared to a terminal in which a larger remaining time is set. By gradually increasing the CW also every retransmission, it is possible to obtain the advantage of lowering a collision probability with other terminals, as in the conventional CSMA/CA.

As in the example of the exponential distribution, the probability density distribution to be used may be a distribution giving a probability which is higher as a probability variable x is smaller or may be another distribution. Any distribution may be used, as long as the distribution is a probability density distribution in which the smaller the remaining time is, the smaller an expectation value E(x) is.

By determining the backoff time by the random number generation confirming to the probability density distribution, a probability to be determined can be increased at the backoff time which is smaller as the remaining time is smaller, unlike the random number generation conforming to the uniform distribution. Accordingly, since the acquisition priority of the transmission access right can be increased for a wireless communication terminal in which the remaining time is smaller, the data transmission can be completed more reliably until the time-out time.

In the wireless communication apparatus according to this embodiment, as described above, the policies are used in which the CW value and the AIFS value used for the CSMA/CA control are set to be smaller, as the remaining time is smaller. Therefore, a wireless communication apparatus having data for which the remaining time is smaller, that is, the time remaining until the time-out is smaller can preferentially acquire the transmission access right, and thus the probability of transmitting data in preference to other terminals in which the remaining time is larger can be increased. Accordingly, it is possible to provide a high reliable wireless communication apparatus for which the possibility of completing the data transmission more reliably without time-out is improved with regard to the data transmission in which the time remaining until the time-out is small.

Specifically, the preference is achieved according to the remaining time by causing the AIFS value to be smaller as the remaining time is smaller. Further, the time taken to consume the backoff time is designed to be shortened by generating a random number based on the CW width which is smaller as the remaining time is smaller. By shortening the backoff time, it is possible to acquire the transmission access right in preference to a wireless terminal in which the remaining time is large, and it is also possible to obtain the advantage of basically preventing the delay time from increasing by absolutely shortening the time, even when there is no competition with other wireless terminals. Originally, when the CW width is set to be small, there is a concern that a probability of collision with other terminals may increase. In this embodiment, however, since the preference is achieved according to the remaining time even with respect to the AIFS value, the influence of a competing terminal can be suppressed as small as possible.

In this embodiment, the example of the access control has been described in which the transmission starts after it is detected that a channel is in an available state through the carrier sense and then the backoff time based on a random value selected from the AIFS and the CW width passes. However, the embodiment can be also applied to access control in which the AIFS is not used. That is, the embodiment can be also applied to access control in which the transmission starts after it is detected that a channel is in an available state through the carrier sense, and then the backoff time based on a random value selected from the CW width passes.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. A wireless communication apparatus that performs access control which starts transmission after a backoff time passes since an available state of a channel is detected through carrier sense, the backoff time being set based on a random value selected within a contention window width, the wireless communication apparatus comprising:
   a remaining time calculating unit configured to calculate a remaining time until a request delay time time-outs after data is generated; and
   a setting unit configured to set the contention window width according to the remaining time calculated by the remaining time calculating unit,
   wherein the random value is generated using a probability density function of the random value,
   wherein an expectation value of the probability density function is set according to the remaining time calculated by the remaining time unit, and
   wherein the expectation value of the probability density function set according to a first remaining time is smaller than that set according to a second remaining time.

2. The apparatus according to claim 1, wherein the remaining time calculating unit calculates the remaining time when Busy is detected during the backoff time.

3. The apparatus according to claim 1, wherein the remaining time calculating unit calculates the remaining time immediately after the available state of the channel is detected through the carrier sense.

4. The apparatus according to claim 1, wherein the remaining time calculating unit calculates the remaining time whenever retransmission of the data is determined.

5. The apparatus according to claim 1, wherein the second remaining time is longer than the first remaining time.

6. A wireless communication apparatus that performs access control which starts transmission after a fixed time and a backoff time pass since an available state of a channel is detected through carrier sense, the backoff time being set based on a random value selected within a contention window width, the wireless communication apparatus comprising:
   a remaining time calculating unit configured to calculate a remaining time until a request delay time time-outs after data is generated;
   a first setting unit configured to set the fixed time according to the remaining time calculated by the remaining time calculating unit; and
   a second setting unit configured to set the contention window width according to the remaining time calculated by the remaining time calculating unit,
   wherein the first setting unit and the second setting unit set the fixed time and the contention window width such that a sum of a fixed time and a maximum backoff time settable from a contention window set according to a first remaining time is smaller than a fixed time set according to a second remaining time, the second remaining time being any remaining time longer than the first remaining time.

7. The apparatus according to claim 6, wherein the remaining time calculating unit calculates the remaining time when Busy is detected during the fixed time.

8. A wireless communication method for a wireless communication apparatus having a transmitting unit, the method comprising:
   calculating, with the wireless communication apparatus, a remaining time until a request delay time time-outs after data is generated;
   setting, with the wireless communication apparatus, a contention window width according to the remaining time; and
   performing access control which starts transmission via the transmitting unit after a backoff time passes since an available state of a channel is detected through carrier sense, the backoff time being set based on a random value selected within the contention window width,
   wherein the random value is generated using a probability density function of the random value,
   wherein an expectation value of the probability density function is set according to the remaining time, and
   wherein the expectation value of the probability density function set according to a first remaining time is smaller than that set according to a second remaining time.

9. The method according to claim 8, further comprising calculating, with the wireless communication apparatus, the remaining time when Busy is detected during the backoff time.

10. The method according to claim 8, further comprising calculating, with the wireless communication apparatus, the remaining time immediately after the available state of the channel is detected through the carrier sense.

11. The method according to claim 8, further comprising calculating, with the wireless communication apparatus, the remaining time whenever retransmission of the data is determined.

12. The method according to claim 8, wherein the second remaining time is longer than the first remaining time.

13. A wireless communication method for a wireless communication apparatus having a transmitting unit, the method comprising:
   calculating, with the wireless communication apparatus, a remaining time until a request delay time time-outs after data is generated; and
   setting, with the wireless communication apparatus, a fixed time and a contention window width according to the remaining time, wherein the fixed time and the contention window width are set such that a sum of a fixed time and a maximum backoff time settable from a contention window width set according to a first remaining time is smaller than a fixed time set according to a second remaining time, the second remaining time being any remaining time longer than the first remaining time; and
   performing access control which starts transmission via the transmitting unit after the fixed time and a backoff time pass since an available state of a channel is detected through carrier sense, the backoff time being set based on a random value selected within the contention window width.

14. The method according to claim 13, further comprising calculating, with the wireless communication apparatus, the remaining time when Busy is detected during the fixed time.

* * * * *